United States Patent [19]

Bartel et al.

[11] 4,214,689

[45] Jul. 29, 1980

[54] AUTOMATIC COUNTERACTING OF TRANSVERSE SHIFT OF A LONGITUDINALLY TRANSPORTED STRIP

[75] Inventors: Siegfried Bartel, Gauting; Ernst Biedermann, Taufkirchen; Heinz Rapp, Munich; Martin Müller, Unterhaching, all of Fed. Rep. of Germany

[73] Assignee: AGFA-Gevaert, A.G., Leverkusen, Fed. Rep. of Germany

[21] Appl. No.: 927,521

[22] Filed: Jul. 24, 1978

[30] Foreign Application Priority Data

Jul. 29, 1977 [DE] Fed. Rep. of Germany ....... 2734325

[51] Int. Cl.² .............................................. B65H 25/26
[52] U.S. Cl. ...................................... 226/21; 242/57.1
[58] Field of Search .............................. 226/15, 18–23, 226/17; 242/57.1

[56] References Cited

U.S. PATENT DOCUMENTS

| 3,147,898 | 9/1964 | Huck | 226/21 X |
| 4,073,448 | 2/1978 | Kolosov | 242/57.1 |

FOREIGN PATENT DOCUMENTS 951754 7/1974 Canada ...................................... 226/18

Primary Examiner—Leonard D. Christian
Attorney, Agent, or Firm—Michael J. Striker

[57] ABSTRACT

The longitudinally transported strip passes and is pressed between two cooperating transport rollers. The rotation axes of the two rollers are normally parallel to each other. One roller is swingably mounted about a swing axis which intersects and is perpendicular to the rotation axis of the other, non-swingable roller. Edge sensors are displaced by the lateral edges of the transported strip, when the strip improperly shifts transversely. The force thusly exerted upon an edge sensor is transmitted, via a force-multiplying lever system, to the swingable transport roller, swinging the latter to a position such that the swung transport roller exerts upon a major surface of the transported strip a force whose transverse component is directed opposite to the direction of the improper transverse shift, resulting in automatic recentering.

10 Claims, 3 Drawing Figures

AUTOMATIC COUNTERACTING OF TRANSVERSE SHIFT OF A LONGITUDINALLY TRANSPORTED STRIP

BACKGROUND OF THE INVENTION

The present invention relates to systems which automatically regulate the transport of longitudinally transported strip material, especially large-width photographic roll paper transported through a copying machine, in such a manner that sensors at the lateral edges of the transported strip detect transverse shifting of the strip and initiate corrective recentering action performed by position-correcting means.

In a great variety of practical applications, it is necessary to assure that the longitudinal transport of strip material is performed with great exactness. This is an important concern, for example, in photographic copying or printing machines, which must be capable of handling paper strips of various different breadths up to a breadth of about 30 cm or more. If the transported strip is quite narrow, then rigid, stationary transverse or lateral guide structures may often be adequate, depending upon the type of strip stock employed. However, generally, if the breadth of the strip stock exceeds about 10 cm, stationary lateral guide structures are no longer adequate; instead of providing lateral guidance and positioning force, applied to the strip transverse to its transport direction, the lateral guide structure merely deform the edge portions of the strip, due to the strip's tendency to curl up and/or due to its relatively low stiffness.

It is known, for example from U.S. Pat. No. 3,001,680, to provide sensing rollers at the lateral edges of the transported strip. The sensing rollers sense transverse shifting of the transported strip and, through the intermediary of a lever coupling, activate the drive motor for a transverse-shifting structure serving to shift the transported strip transversely back to centered position. Such known systems, however, are quite expensive and complicated in their operation. A particular disadvantage of them, is that the transverse-shifting structure used to return the strip to centered position presses on the edges of the strip; if the strip has a marked tendency to roll or curl up, or is otherwise very flexible, little or no corrective transverse shifting may actually result. In particular, photographic roll paper of the type nowadays typically employed cannot be adequately centered using such systems; the inherent stiffness of the paper is so low that its edges cannot in general follow along the recentering structure, and instead may often merely become deformed. Furthermore, such deformation, i.e., the pressure applied to the strip in the course of such deformation, can result in improper exposure of the strip at its edges.

SUMMARY OF THE INVENTION

Accordingly, it is the general object of the invention to provide an automatic strip centering system of the type in question, but capable of sensitively correcting even small transverse shifts even in the case where the transported strip is of a material having very low stiffness.

This is accomplished using a transport roller pair, one roller of which can be swung about an axis which is perpendicular to the rotation axis of the other transport roller, or the equivalent. If a transport roller pair is employed, then the swinging of the swingable transport roller is performed in automatic response to transverse-shift detection performed by strip-edge sensors.

With the inventive system, even if the transverse shift detected by the edge sensors is quite small, the system reacts quickly and decisively to recenter the transported strip. Preferably, the edge sensors are displaceable structures which are displaced by the strip edges when the strip goes uncentered, and the force thusly exerted upon the edge sensor is multiplied by a transmission and used as the corrective force serving to swing the swingable roller of the transport roller pair, or the like. Even if the force thusly exerted upon the edge sensor is quite small, the corrective force transmitted to the swingable transport roller, or the equivalent, is strong and decisive enough to result in exact recentering. In this way, automatic centering can be accurately performed, even if the transported strip material is of relatively great breadth and softness, i.e., of relatively low stiffness.

In one embodiment of the invention, the swingable transport roller can be a so-called self-aligning roller, i.e., a roller carried on a self-aligning ball roller bearing, the roller bearing being pressed by biasing springs against the non-swingable other one of the two transport rollers. The self-aligning roller is controlled by wheels bearing upon it at its sides, these wheels being coupled via a lever-type transmission to the edge sensors for the strip. In this embodiment, the adjusting of the arrangement is performed particularly simply. Furthermore, the provision of a lever-type transmission between the edge sensors and the wheels bearing on the self-aligning roller produces decisive corrective force even if the amount of the transverse shift of the transported strip is very small.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
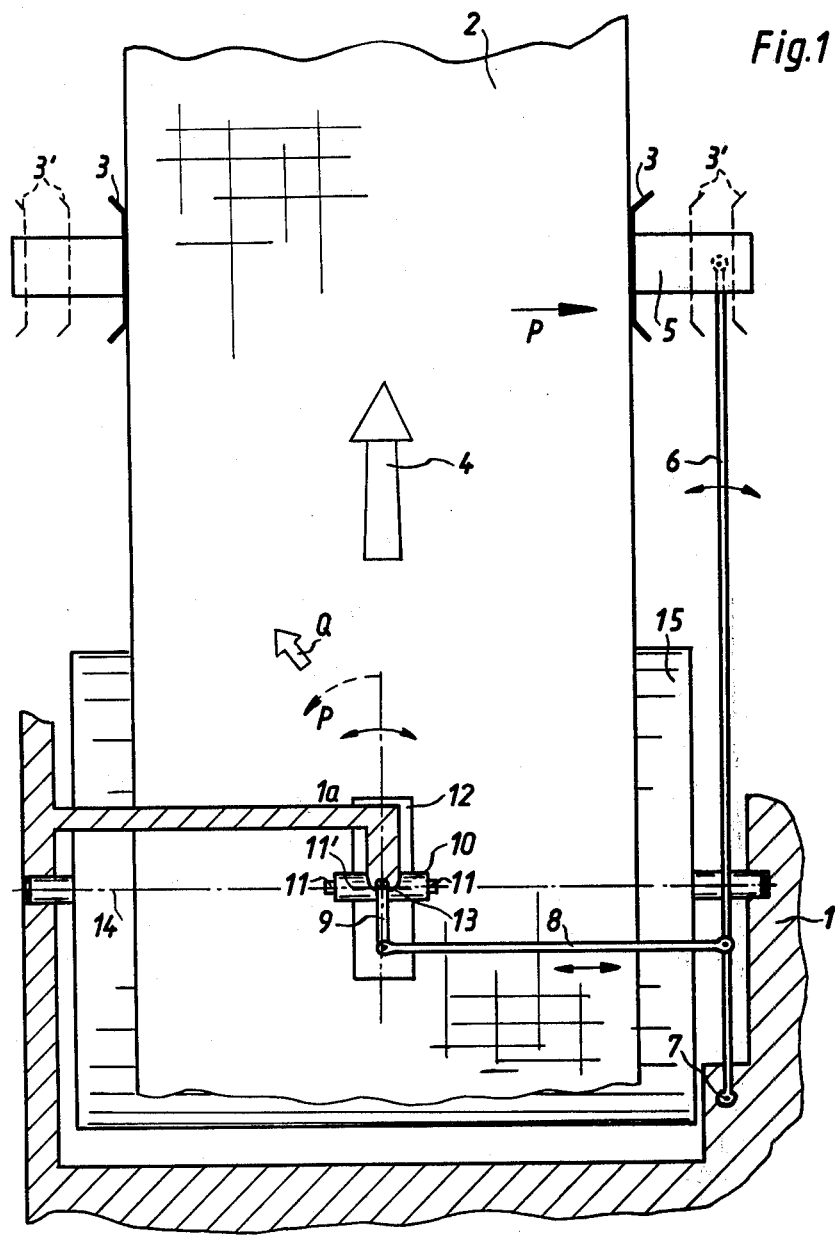
FIG. 1 is a schematic top view looking down upon a first embodiment of the invention.

In FIG. 1, numeral 1 denotes the framework of a photographic copying or printing machine, through which is being transported a photographic emulsion strip 2, i.e., photographic roll paper. The strip 2 travels between two lateral guidance elements 3, which simultaneously serve as transverse-shift sensors. Sensors 3 are mounted on a common bar 5 which extends perpendicular to the transport direction 4 of the strip 2. The sensors 3 are adjustably mounted on the transverse bar 5, so as to be able to accommodate strips 2 of differing breadths, as indicated by the broken-line depictions at 3'. The transverse bar 5 is mounted by (non-illustrated) means for sliding motion in the direction of its elongation, or preferably is spring-supported in a manner described below in connection with another embodiment.

Articulately coupled to the transverse bar 5 is one end of a long transmission lever 6, the other end 7 of which is swing mounted on the copying-machine framework 1, i.e., mounted for swinging motion about a swing axis which is normal to the illustration-plane in FIG. 1. At a point on lever 6 which is closer to end 7 than to transverse bar 5, there is articulately coupled to lever 6 one end of a lever 8, whose other end is articulately coupled to one end of a crank 9. The other end of crank 9 is mounted in a portion 1a of framework 1 and, at this other end of crank 9, crank 9 is swingable about a swing axis 13 extending normal to the illustration-plane in FIG. 1. Rigidly connected to crank 9, and therefore sharing its swinging capability, is a mounting bracket 10, for example a generally U-shaped bracket whose side legs extend vertically downwards, i.e., normal to and into the illustration-plane in FIG. 1. Mounting bracket 10, for example at the lower ends of its two depending legs, supports the axial bearing 11 of a small transport roller 12.

Small roller 12 cooperates with a larger, non-swingable roller 15, forming a transport roller pair. Larger roller 15 may be a driven roller exerting transport force, or may be a roller passively driven by the transported strip 2. The cooperating transport rollers 12, 15 press the transported strip 2 between them.

When swingable roller 12 is in its normal position, its rotation axis 11' is parallel to the rotation axis 14 of cooperating larger roller 15. However, the rotation axis 11' of swingable roller 12 can be swung about swing axis 13, so that rotation axis 11' turns in a horizontal plane (i.e., in the illustration-plane of FIG. 1), as indicated by the double-headed curved arrow.

The system depicted in FIG. 1 operates as follows:

When the strip 2 is being properly transported, it travels exactly in the direction of arrow 4, and does not shift transversely and become decentered. If, for any reason, a transverse shift of the transported strip 2 develops, for example in the direction of solid-line arrow P, one of the sensors 3 and accordingly the transverse bar 5 shift in this direction. Accordingly, the long lever 6 turns clockwise (as viewed in FIG. 1) about its swing axis at 7, thereby drawing lever 8 in the same direction as the transverse strip shift, here rightwards. This turns crank 9 counterclockwise (as viewed in FIG. 1) about vertical swing axis 13, the mounting bracket 10 and smaller roller 12 sharing this swinging movement about vertical swing axis 13. As a result, the rotation axis 11' of smaller roller 12 is no longer parallel to the rotation axis 14 of larger roller 15, the roller 12 now having swung in the direction indicated by the curved broken-line arrow P. As a result of the now angular relationship between the rotation axes 11', 14 of the two rollers 12, 15, the strip 2 transported between these rollers is subjected to a force Q, whose transverse vectorial component is directed opposite to the direction of the transverse strip shift P. This sidewards corrective force Q returns the strip 2 to its centered position, and in the course of this return the sensors, lever arms and roller 12 return to their initial positions, the strip 2 now again being transported exactly in the direction of arrow 4.

If the sense of the transverse strip shift were in the other direction, i.e., leftwards as viewed in FIG. 1, the components referred to would perform equivalently, but moving in the directions opposite to those just mentioned.

As shown in FIG. 1, the swingable roller 12 is kept quite narrow (of short axial length) relative to the breadth of strip 2, to minimize the mass of the swinging structure. Also, it will be noted that the force needed to swing roller 12 and thereby effect the shift correction is actually derived from the sensors 3 themselves. Because the lever 8 is coupled to long lever 6 near the swing axis of the latter, the force exerted upon the affected one of sensors 3 by the edge of the transversely shifted strip 2 is considerably multiplied, during its transmission to swinging roller 12.

Figure 2:
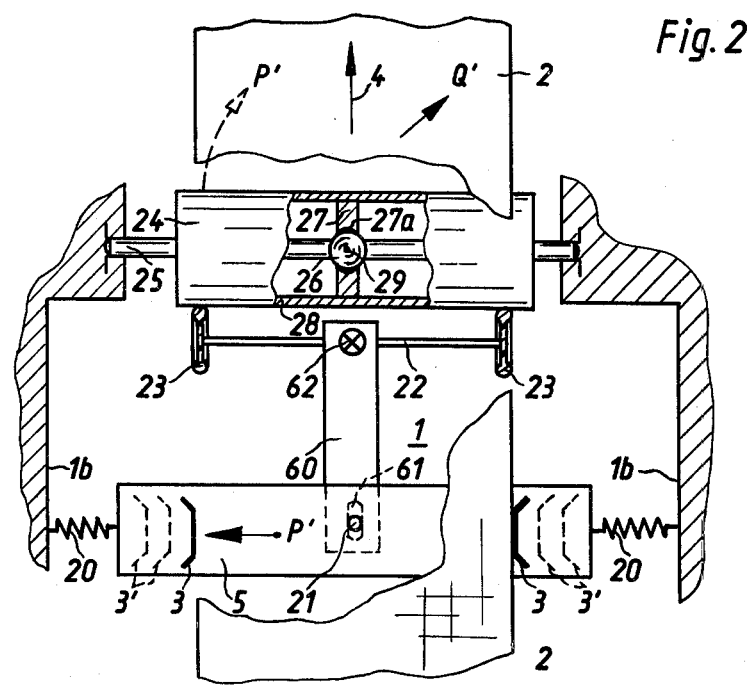
FIG. 2 is a schematic top view looking down upon a second embodiment of the invention.

FIG. 2 is a top view looking down upon a second embodiment of the invention. For the sake of clarity the non-swingable one of the two rollers, which is located above the transported strip 2, is omitted from the drawing. In this embodiment, the swingable roller is located beneath the transported strip 2, and the sensors are located upstream of the corrective elements, as considered in the direction of strip transport.

In this embodiment, the lateral guide elements 3, also constituting the strip edge sensors, are again mounted on a transverse bar 5. Here, the mounting of transverse bar 5 is a spring-hung one, the bar 5 being hung from framework 1b by means of two tension springs 20. As before, the transverse bar 5 shifts in the direction of its elongation, in response to transverse shifting or decentering of the transported strip 2. Midway between its ends, the transverse bar 5 is provided with a pin 21 which extends into a slot 61 formed at one end of a lever 60. The other end of lever 60 is mounted at 62 for swinging movement about a stationary vertical pivot axis at 62, i.e., a pivot axis extending normal to the illustration-plane in FIG. 2. At this end of lever 60 there is secured to lever 60, to share its swinging movement, a shaft 22 which extends generally parallel to the axes of the rollers of the transport roller pair. Rotatably mounted on the ends of shaft 22 are wheels 23 which bear upon the cylindrical peripheral surface of the swingable roller 24. The mounting shaft 25 of swingable roller 24 is borne by the side walls 1b of the machine's framework 1. Midway between its ends, mounting shaft 25 comprises a spherical bearing portion 26. The inner surface of hollow swingable roller 24 is provided with a radially inwardly extending bearing 27, the radially innermost surface 27a of which is spherical in correspondence to the spherical bearing portion 26. Bearing 27 is rigid with the casing 28 of the swingable roller 24.

This self-aligning-type roller 24, with its self-aligning bearing 26, 27, 27a, is open at its axial ends, to maximize the angle through which roller 24 can swing relative to its mounting shaft 25. In cooperation with the (non-illustrated) transport roller above strip 2 and with the wheels 23, the self-aligning roller 24 can be swung, its swinging axis being more or less limited to an axis 29 extending vertically, i.e., normal to the illustration-plane in FIG. 2, the axis 29 passing through the geometrical center of the spherical bearing portion 26 of mounting shaft 25.

The system depicted in FIG. 2 operates as follows:

If the transported strip 2 transversely shifts in the direction of solid-line arrow P', the transverse bar 5 and accordingly the slot 61 in lever 60 likewise shift in this direction. As a result, the shaft 22 swings clockwise (as viewed in FIG. 1) about its swing axis at 62, and the self-aligning roller 24 similarly swings clockwise about its swing axis 29; i.e., the roller 24 swings in the direction of curved broken-line arrow P'. Because the strip 2 is now being pressed and transported between two cooperating rollers whose rotation axes are not parallel to each other, the strip 2 is subjected to a generally transverse force component Q', the exactly transverse component of which is directed opposite to the direction of the transverse shift. As a result, the strip 2 is returned to its centered position.

Figure 3:
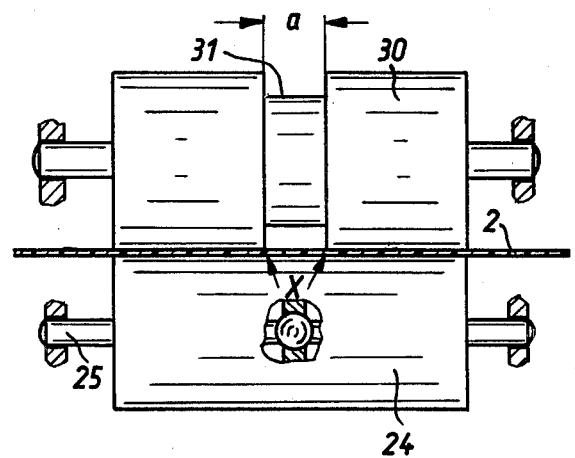
FIG. 3 is a side view showing the shapes of preferred transport rollers.

FIG. 3 depicts a particular design for the upper counterpressure roller 30 not shown in FIG. 2. Midway between its axial ends, roller 30 has a radially inward recess 31 of axial length a; the radial depth of the recess is for the most part uncritical. The purpose of this recess 31 is as follows:

If both rollers of the transport roller pair have simple cylindrical surfaces, then when one roller is swung to an angle relative to the other, the contact between the surfaces of the rollers is essentially a point-contact. This point or small spot of contact may vary in position, as the surfaces of the rollers wear with use. Providing the recess 31, in contrast, establishes two well defined contact points X when the rotation axes of the two rollers are not parallel. Selection of the axial length a of the recess 31 can be performed in dependence upon the physical properties of the particular strip material to be transported, and can also be performed to preselect the sensitivity of the system.

To facilitate automatic thread-in of the leading end of a strip to be transported, it is advantageous that the transport roller pair having the self-aligning roller be located downstream of the edge sensors. In this connection, the spring-hung mounting of transverse bar 5 also serves to assure that the edge sensors are always properly centered.

It will be understood that each of the elements described above, or two or more together, may also find a useful application in other types of constructions differing rom the types described above.

While the invention has been illustrated and described as embodied in the guidance and automatic centering of longitudinally transported photographic roll paper in a photographic copying or printing machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus comprising means longitudinally transporting an elongated strip along a predetermined transport path, an arrangement serving to automatically counteract the development of improper transverse shift in the transported strip, the arrangement comprising, in combination, sensing means operative for sensing transverse shift in the longitudinally transported strip; and correcting means automatically operative in response to the detection of shift by the sensing means for exerting upon the major surface of the transported strip a shift-correcting force which transversely displaces the transported strip in a direction opposite to the detected transverse shift, the sensing means comprising edge-sensing means operative for sensing the position of a lateral edge of the transported strip, the correcting means comprising a pair of transport rollers located at opposite major surfaces of the transported strip and pressing the transported strip between them, means mounting the transport rollers such that the rotation axes of the rollers are normally parallel but including means mounting one of the transport rollers for swinging movement about a swing axis generally perpendicular to the rotation axis of the other transport roller, and connecting means connecting the swingable transport roller to the edge-sensing means and automatically swinging the swingable transport roller in dependence upon the transverse shift detected by the edge-sensing means in a direction causing the swingable transport roller to exert said shift-correcting force upon a major surface of the transported strip.

2. In an apparatus as defined in claim 1, the edge sensing means comprising at least one edge sensor mounted to engage a lateral edge of the transported strip and to be displaced by such lateral edge upon the development of transverse shift, the correcting means including force-multiplying means coupled to the edge sensor and operative for mechanically deriving the shift-correcting force from the force exerted on the edge sensor by the lateral edge of the transported strip.

3. In an apparatus as defined in claim 1, the pair of transport rollers being located downstream of the edge-sensing means, as considered in the direction of strip transport.

4. In an apparatus as defined in claim 1, the axial length of the swingable transport roller being small relative to the axial length of the other transport roller.

5. In an apparatus as defined in claim 1, the connecting means comprising a lever transmission transmitting force from the edge-sensing means to the swingable transport roller.

6. In an apparatus as defined in claim 1, the swingable transport roller being a hollow roller, the mounting means comprising a non-swingably mounted mounting shaft for the swingable transport roller and means swingably mounting the swingable transport roller on the mounting shaft with the swingable transport roller surrounding the non-swingable mounting shaft, the connecting means including displacing means mounted to engage the peripheral surface of the swingable transport roller and thereby swing the latter and a lever transmission coupling the displacing means to the edge-sensing means.

7. In an apparatus as defined in claim 6, the lever transmission including a lever mounted for swinging movement about a swing axis and coupled to the edge-sensing means for converting transverse movement of the edge-sensing means into swinging movement, the displacing means including a swingable mounting shaft mounted on said lever parallel to the geometrical axis of the swingable transport roller and wheels mounted on the swingable mounting shaft, the wheels engaging the peripheral surface of the swingable transport roller and transmitting swinging motion to the latter.

8. In an apparatus as defined in claim 6, said other roller being non-swingably mounted and having intermediate its axial ends a radially inwards annular recess.

9. In an apparatus as defined in claim 1, the edge-sensing means comprising a bar, means mounting the bar to extend and be displaceable transverse to the transport direction of the strip, and edge-engaging elements mounted on the bar and engaging opposite lateral edges of the transported strip whereby to serve as both edge-sensing and also edge-guiding elements, the edge-engaging elements being adjustably mounted on the bar to accommodate strips of differing breadth, the connecting means comprising a lever transmission coupling the bar to the swingable transport roller.

10. In an apparatus as defined in claim 9, the means mounting the bar comprising support springs establishing a spring-hung mounting of the bar.

* * * * *